June 3, 1952  P. L. ARMSTRONG ET AL  2,598,963
AUTOMOBILE RADIATOR CLEANING DEVICE
Filed Aug. 15, 1949

P. L. Armstrong
D. B. Pence
INVENTOR

BY C. A. Snow & Co.
ATTORNEYS.

UNITED STATES PATENT OFFICE 2,598,963

AUTOMOBILE RADIATOR CLEANING DEVICE

Paul L. Armstrong, Johnson City, and
David B. Pence, Limestone, Tenn.

Application August 15, 1949, Serial No. 110,342

1 Claim. (Cl. 134—102)

This invention relates to an appliance for cleaning automobile radiators, and more particularly, to a device of the type stated adapted to be applied to an automobile radiator after said radiator has been removed from the vehicle, and is positioned in a bath of cleansing fluid in a cleaning vat.

An important object of the present invention is to provide a device of the type stated which will efficiently dislodge foreign material that is clogging an automobile radiator.

Still another important object is to provide a device of the type stated which is readily applied to or removed from the radiator to be cleaned, so as to permit the operation to be performed with speed and ease.

Still another object is to provide a device of the type stated that can be manufactured at low cost, but which will nevertheless be highly durable.

Summarized briefly, the invention comprises a tube open at both ends, one end of the tube being adapted to be connected to the radiator to be cleaned; an air tube extending through the wall of said tube and considerably smaller in diameter than the diameter of the tube; a tapered cap on the inner end of the air tube, the tube opening inside the cap so that air forced through the tube is given reverse flow by the cap as said air issues from the tube, the cap being spaced from the wall of the main tubular body so that said air will cause the cleansing fluid to rush through the tubular body and through the automobile radiator for the purpose of cleaning said radiator.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings.

Figure 1:
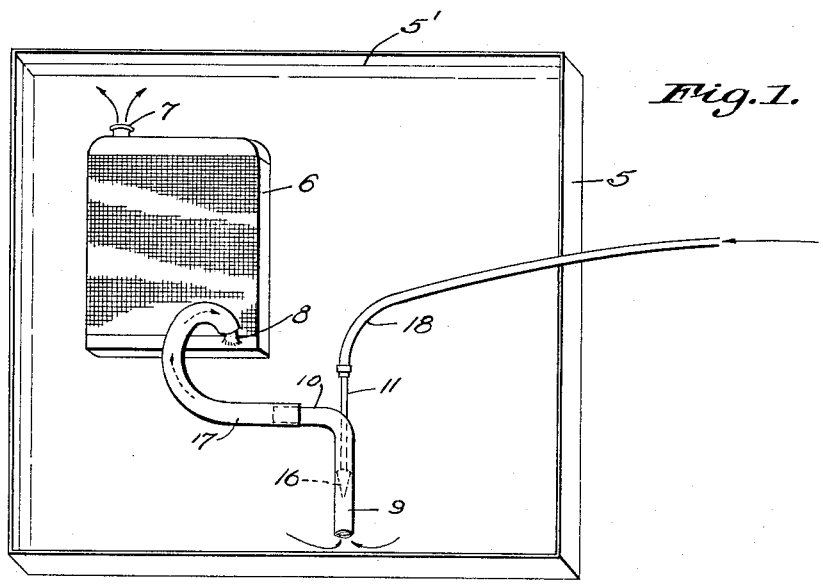
Fig. 1 is a top plan view of the invention as applied to an automobile radiator positioned in a cleansing vat.

Referring to the drawings in detail, the reference numeral 5 designates a conventional cleansing vat, and it will be understood that this cleansing vat will be filled with cleansing fluid 5' to a level sufficient to cover completely an automobile radiator 6 positioned horizontally on the bottom of the vat, said automobile radiator 6 having the usual openings 7 and 8 at opposite ends thereof.

The device constituting the subject of the present application includes a main or outer tube 9 open at both ends and having one end extended laterally as at 10 so that said main or outer tube is substantially of L shape so as to permit insertion through the bend in the tube of a straight air tube 11 of considerably less diameter than the diameter of the main tube 9. Where the air tube 11 enters through the wall of the main tube 9, a weld 12 secures the connection permanently and in a manner to make said connection leak-tight.

The inner end of the air tube 11 terminates intermediate the ends of the main tube 9, and secured upon the inner end of the air tube is a conical cap 13, a weld 14 being used to permanently secure said cap upon the inner end of the air tube 11. One or more openings 15 are formed in the inner end of the air tube 11 so as to permit air forced under pressure through said air tube 11 to be emitted into the cap 13, whereby the cap 16 will give reversed flow to said air under pressure, causing said air as it enters the main tube 9 to be forced through said main tube in the direction of the radiator 6.

That end of the main tube 9 that is disposed closest to the radiator 6 is fitted with a flexible hose 17 the other end of which is connected to the opening 8 at one end of the radiator. An air hose 18 is connected to the outer end of the air tube 11 and extends from any suitable device which will supply air under pressure.

Figure 2:
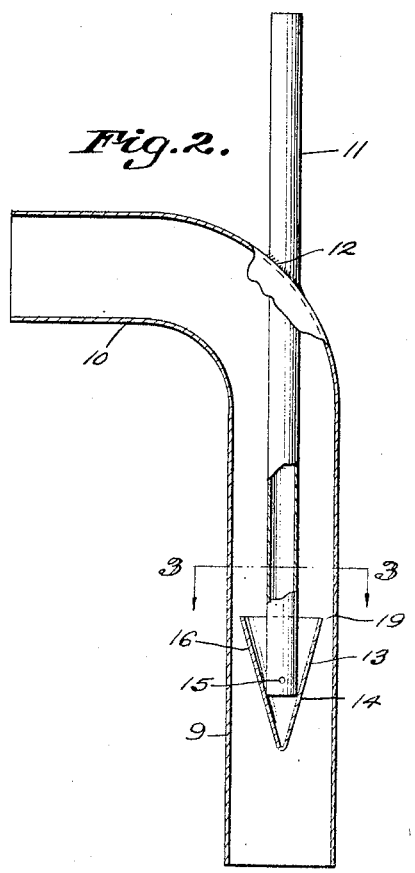
Fig. 2 is an enlarged longitudinal section therethrough.
Figure 3:
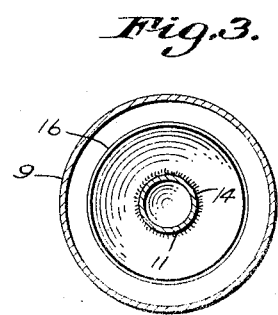
Fig. 3 is an enlarged transverse section on line 3—3 of Fig. 2.

As may be noted from Fig. 2, the base or widest portion of the conical cap 13 is spaced at all points from the wall of the main tube 9, as may be seen at 19 in Fig. 2.

I believe the operation of the device may now be readily noted. As previously stated the radiator 6 to be cleaned is deposited in the cleansing fluid 5' below the level of said fluid, so that both the openings 7 and 8 of the radiator are positioned below the fluid level. The hose 17 is then applied to either the opening 7 or the opening 8 as desired. The device constituting the subject of the invention is then connected to the other end of the hose 17 and deposited at the bottom of the vat 5 so as to also be entirely below the level of the cleansing fluid 5'. Air is then supplied under pressure through the air hose 18.

The air is forced under high pressure through the openings 15 at the inner end of the air tube 11, and is given reverse flow as it enters the main tube 9. As said air moves under high pressure in the direction of the automobile radiator 6, it will induce flow of the cleansing fluid through the main tube 9, also in the direction of the radiator 6. As a result, cleansing fluid is forced through the opening 8 of the radiator, and will move in a continuous flow under considerable pressure through the core, issuing with dislodged foreign material from the other opening 7 of the radiator. It may be noted, in this connection, that a full cycle of flow is thus caused to result in the cleansing fluid 5' in the vat 5. The cleansing fluid 5' will continuously issue from the opening 7 of the radiator, and will move around so as to enter the free end of the main tube 9, shown at the lower end of Fig. 1, the arrows indicating the direction of fluid flow. The fluid will again move back through the main tube 9, the hose 17, and thence again through the radiator 6 and this continuous flow cycle continues until the radiator is fully cleaned.

What is claimed is:

A device for cleaning automobile radiators including a main tube open at both ends, means for connecting one end to one end of a radiator to be cleaned, the other end of the main tube being left open to permit fluid to enter the main tube and enter the radiator to move entirely through said radiator, an air tube extending through the wall of the main tube and having its inner end terminating intermediate the ends of the main tube, a cap on the inner end of the air tube, said cap being conical fully from end to end thereof, the inner end of the air tube having a fixed, leak-proof connection to the inner surface of the cap, said air tube having openings in its side wall communicating with the interior of the cap and said conical cap adapted to give reverse flow to air discharged under pressure through said openings, the conical cap being spaced from the wall of the main tube so as to induce flow of fluid through the main tube and through the automobile radiator.

PAUL L. ARMSTRONG.
DAVID B. PENCE.

REFERENCES CITED

The following references are of record in the file of this patent:

UNITED STATES PATENTS

| Number | Name | Date |
| --- | --- | --- |
| 263,349 | Opper | Aug. 29, 1882 |
| 1,865,289 | Trowbridge | June 28, 1932 |